United States Patent
Patel et al.

(10) Patent No.: US 9,531,931 B2
(45) Date of Patent: Dec. 27, 2016

(54) ASYMMETRIC MULTIPHASE BOOST FOR DISPLAY BACKLIGHTS

(71) Applicant: Apple Inc., Cupertino, CA (US)

(72) Inventors: Parin Patel, San Francisco, CA (US); Stephen J. Hrinya, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 14/502,886

(22) Filed: Sep. 30, 2014

(65) Prior Publication Data

US 2016/0094763 A1    Mar. 31, 2016

(51) Int. Cl.
*H04N 5/225* (2006.01)
*H04N 5/232* (2006.01)
(Continued)

(52) U.S. Cl.
CPC .......... *H04N 5/2256* (2013.01); *G09G 3/3406* (2013.01); *H02M 3/1584* (2013.01); *H04N 5/23241* (2013.01); *H04N 5/23293* (2013.01); *H05B 33/0815* (2013.01); *H05B 33/0845* (2013.01); *H05B 33/0872* (2013.01); *G09G 2330/02* (2013.01); *H02M 1/36* (2013.01); *H02M 2001/0032* (2013.01); *H04M 1/22* (2013.01);
(Continued)

(58) Field of Classification Search
CPC .......................... H04N 5/2256; H04N 5/23241
USPC ..................................... 348/370–372, 333.01
See application file for complete search history.

(56) References Cited

U.S. PATENT DOCUMENTS 7,616,097 B1    11/2009    Whang
7,663,691 B2    2/2010    Ciudad et al.
(Continued)

FOREIGN PATENT DOCUMENTS

CN    1512259    7/2004
CN    1726696    1/2006
(Continued)

OTHER PUBLICATIONS

International Search Report and Written Opinion from PCT/US2015/052749, Date of mailing Jan. 5, 2016, Apple Inc., pp. 1-11.
(Continued)

*Primary Examiner* — Lin Ye
*Assistant Examiner* — Chan Nguyen
(74) *Attorney, Agent, or Firm* — Robert C. Kowert; Meyertons, Hood, Kivlin, Kowert & Goetzel, P.C.

(57) ABSTRACT

An asymmetric multiphase boost that provides flash functionality for display backlights. A backlight power management module for a display backlight may implement and control an asymmetric multiphase boost that includes two boost phases: a primary boost phase for typical display backlighting, and a secondary or flash boost phase that provides flash functionality via the display backlight when needed. The primary boost phase may be sized to provide high low-load efficiency, high inductance, and low switching frequency for normal display backlight operations. The flash boost phase may be sized for high current and peak power, low inductance, and high switching frequency for pulsed current applications. Via the asymmetric multiphase boost, the backlight power management module may, for example, be used to provide a camera flash function for front facing cameras.

17 Claims, 6 Drawing Sheets

(51) Int. Cl.
    *H02M 3/158*     (2006.01)
    *H05B 33/08*     (2006.01)
    *G09G 3/34*     (2006.01)
    *H02M 1/36*     (2007.01)
    *H04M 1/22*     (2006.01)
    *H02M 1/00*     (2006.01)

(52) U.S. Cl.
    CPC ..... *H04M 2250/12* (2013.01); *H04M 2250/52* (2013.01)

(56) References Cited

U.S. PATENT DOCUMENTS

| | | | |
|---|---|---|---|
| 8,605,205 B2 | 12/2013 | Ledbetter | |
| 2004/0239799 A1 | 12/2004 | Suzuki et al. | |
| 2005/0093525 A1 | 5/2005 | Walters et al. | |
| 2009/0175555 A1 | 7/2009 | Mahowald | |
| 2010/0194961 A1 | 8/2010 | Patel | |
| 2011/0006745 A1* | 1/2011 | Saphon | H02M 3/156 323/282 |
| 2013/0050233 A1* | 2/2013 | Hirsch | G06F 3/038 345/589 |
| 2014/0159614 A1* | 6/2014 | Hussain | H05B 33/086 315/307 |
| 2014/0189387 A1* | 7/2014 | Vilhauer | G06F 1/3234 713/320 |
| 2014/0219646 A1 | 8/2014 | Hooton et al. | |
| 2015/0077014 A1* | 3/2015 | Ng | H05B 33/0818 315/294 |
| 2015/0102746 A1* | 4/2015 | Hunt | H05B 41/391 315/291 |

FOREIGN PATENT DOCUMENTS

| | | |
|---|---|---|
| CN | 103152529 | 6/2013 |
| CN | 203368849 | 12/2013 |
| JP | 2002335432 | 11/2002 |
| JP | 2004-187154 | 7/2004 |

OTHER PUBLICATIONS

Evaluation Report for Utility Model Patent No. ZL2015209734621, Dated Aug. 17, 2016 (English Translation & Chinese Version), Apple Inc., pp. 1-14.

* cited by examiner

ASYMMETRIC MULTIPHASE BOOST FOR DISPLAY BACKLIGHTS

BACKGROUND

Technical Field

This disclosure relates generally to display systems.

Description of the Related Art

Many mobile devices such as cellphones, smartphones, tablet or pad devices, and mobile computers may include a front-facing camera on the display side of the device that may, for example, be used to capture still images of subjects in front of the display. When capturing a still image of a subject, the subject needs to be adequately illuminated to insure a quality image. Due to cost, space, and other constraints, these devices typically do not include a dedicated light source (e.g., a flash) for use with the front-facing camera. However, many mobile devices that include a front-facing camera may also include a backlit display, for example a liquid-crystal display (LCD) backlit with a light-emitting diode (LED) backlight panel or matrix.

SUMMARY OF EMBODIMENTS

Embodiments of an asymmetric multiphase boost that provides flash functionality for display backlights are described. Embodiments of a backlight power management module for a display backlight, for example a light-emitting diode (LED) display backlight used to provide illumination for a liquid-crystal display (LCD), may implement and control an asymmetric multiphase boost that includes two boost phases: a primary boost phase for typical display backlighting, and a secondary or flash boost phase that provides flash functionality via the display backlight when needed. The primary boost phase may be sized to provide high low-load efficiency, using high inductance and low switching frequency for normal display backlight operations. The flash boost phase may be sized for high current and peak power, using low inductance and high switching frequency for pulsed current applications. Via the asymmetric multiphase boost, the backlight power management module may, for example, be used to provide a camera flash function for front facing cameras.

In some embodiments, for normal display backlight operations, the primary boost phase is enabled, and the flash boost phase is disabled. To trigger a flash, the high power flash boost phase may be enabled to provide a pulsed current to one or more strings of LEDs in the display backlight. The increased pulsed current causes the forward voltage of the LED string(s) to increase, and the boost voltage is increased to compensate. For example, in some embodiments, the asymmetric multiphase boost may provide a pulsed flash at about 4×LED current (power) when compared to the brightest setting used for display backlighting, and about 20×LED current when compared to the typical display brightness setting. When the flash current pulse is over, the flash boost phase is returned to an idle state, allowing the high efficiency, primary boost phase to operate for normal backlighting operations of the display.

Figure 1A:
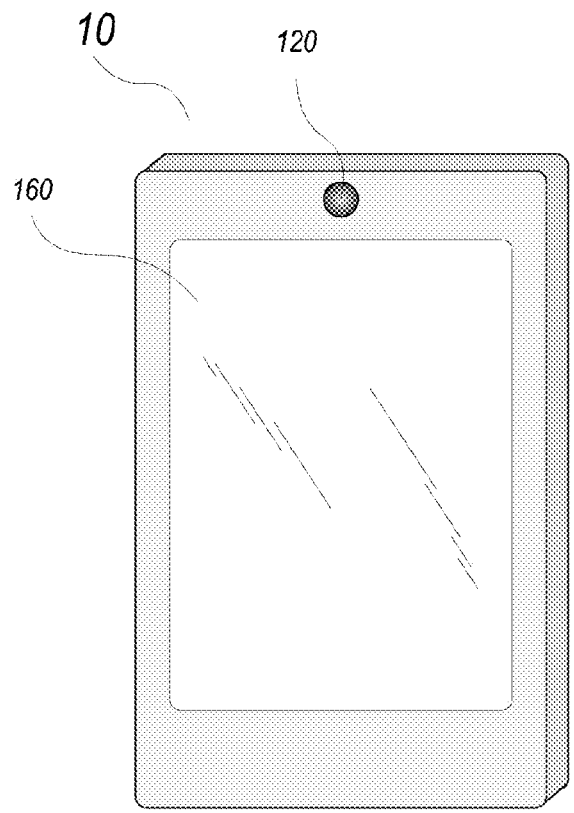
FIGS. 1A and 1B graphically illustrate an example device in which embodiments of an asymmetric multiphase boost for a display backlight may be implemented.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of methods and apparatus for providing flash functionality via display backlights are described. Embodiments of a backlight power management module for a display backlight, for example a light-emitting diode (LED) display backlight used to provide illumination for a liquid-crystal display (LCD) display. To power the LEDs, the backlight power management module may boost input battery voltage to provide sufficient forward current to the display backlight. For example, an input voltage of about 3 volts may be boosted to about 18 volts to power one or more strings of LEDs. The backlight power management module may implement and control an asymmetric multiphase boost that includes two boost phases: a primary boost phase for typical display backlighting, and a secondary or flash boost phase that provides flash functionality via the display backlight when needed. The asymmetric multiphase boost of the backlight power management module may, for example, be used to provide a camera flash function for front facing cameras.

Mobile device applications may impose power constraints on components such as displays, since these devices are typically battery-powered. For optimal battery life, a display backlight in mobile devices should have high efficiency at low-load during typical display backlighting operations. However, to provide a flash function, the backlight power management module needs to provide pulsed peak power capability. Moreover, mobile device applications may impose volume constraints as well as power constraints. To provide high efficiency during typical display backlighting as well as a flash function within the power and volume constraints of mobile device applications, embodiments of a backlight power management module may implement an asymmetric multiphase boost. The primary boost phase may be sized to provide high low-load efficiency (i.e., high efficiency at low-load), using high inductance and low switching frequency for normal display backlight operation. The flash boost phase may be sized for high peak power (current), using low inductance and high switching frequency for pulsed current applications. Via the two-phase boost, the pulsed peak power for the flash function may be supported by the backlight power management module without degrading typical backlight drive efficiency, and with minimal additional required area.

Embodiments of a backlight power management module as described herein may, for example, be implemented in small and/or mobile multipurpose devices such as cell phones, smartphones, pad or tablet computing devices, and laptop, netbook, notebook, subnotebook, and ultrabook computers. However, embodiments may be applied in other applications, for example in displays for desktop computers, and in general in any device or system that includes a backlit display and front-facing camera.

Figure 1B:
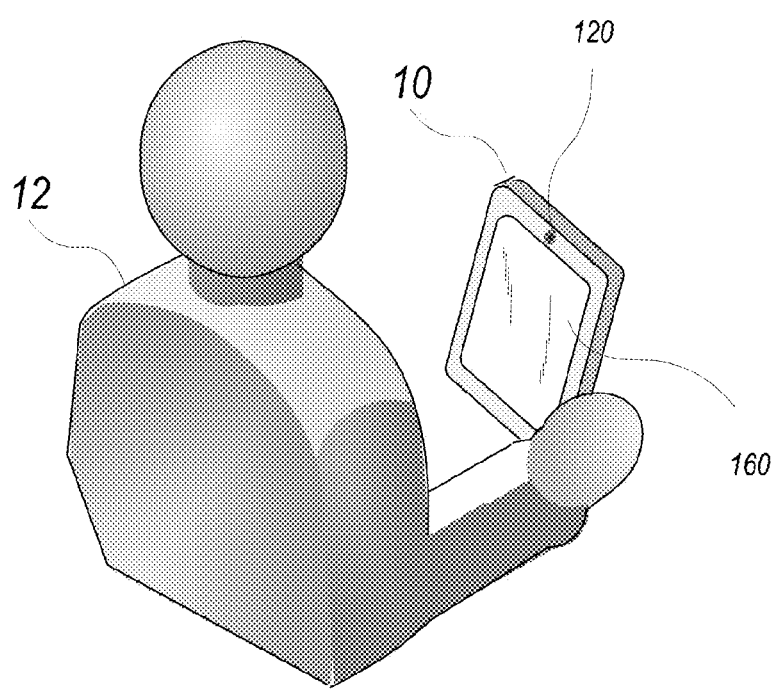

FIGS. 1A and 1B illustrate an example device in which embodiments of an asymmetric multiphase boost for a display backlight as described herein may be implemented. As shown in FIG. 1A, a device 10 may include a display 160 and a front-facing camera 120 oriented to capture images of subjects or scenes located on the display 160 side of the device 10. The display 160 may, for example, be an LED-backlit LCD. An LED-backlit LCD is a liquid-crystal display (LCD) backlit with a light-emitting diode (LED) backlight panel or matrix. Note, however, that embodiments may also apply to other LED-backlit display technologies. While not shown, device 10 may include ambient light sensing technology. FIG. 1B shows a subject 12 facing a device 10 as illustrated in FIG. 1A. The device 10 may, for example, be used for capturing a still image or digital photograph of subject 12 with camera 120, for example using a camera application installed on the device 10. FIG. 7 further illustrates an example computer system that may be used as a device 10, in some embodiments.

Figure 2:
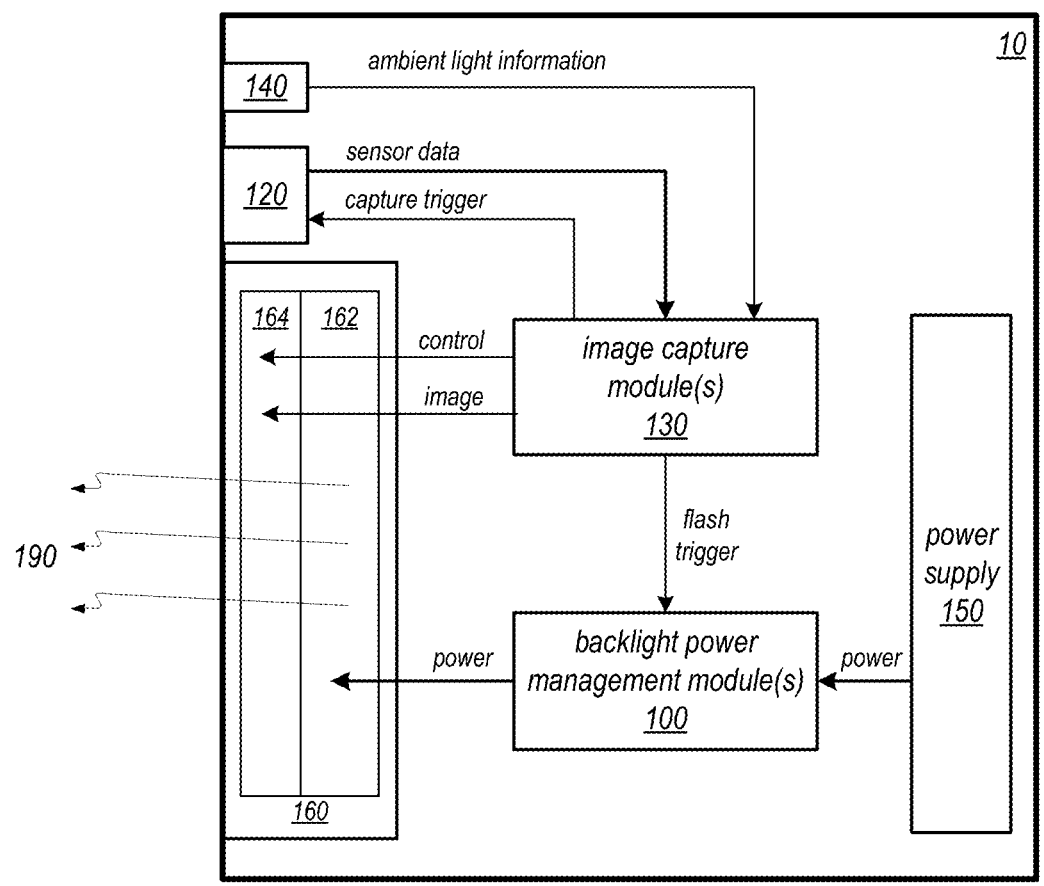
FIG. 2 is a block diagram illustrating an example device that includes a backlight power management module that implements an asymmetric multiphase boost for a display backlight, according to at least some embodiments.

FIG. 2 is a high-level block diagram illustrating an example device 10 that includes a backlight power management module that implements an asymmetric multiphase boost for a display backlight, according to at least some embodiments. As shown in FIG. 2, a device 10 may include a display 160. The display 160 may, for example, be an LED-backlit LCD display including an LCD 164 component configured to display images or other digital content and a backlight 162 component configured to provide illumination 190 for or through LCD 164 component. Device 10 may also include a front-facing camera 120 oriented to capture images of subjects or scenes located on the display 160 side of the device 10. The device 10 may also include one or more image capture modules 130 that may, for example, be configured to control operations of camera 120, obtain digital images captured by a sensor of camera 120, process the digital images, and/or provide captured or processed image data to LCD 164 component of display 160 for viewing. The image capture modules 130 may include hardware components, software components (e.g., a camera application), or combinations thereof. The image capture module(s) 130 may receive ambient light information from one or more ambient light sensor(s) 140; the ambient light information may, for example, be used to aid the determination of required flash levels. Device 10 may also include an internal power supply 150, for example a battery such as a lithium-ion (Li-ION) battery.

Figure 3:
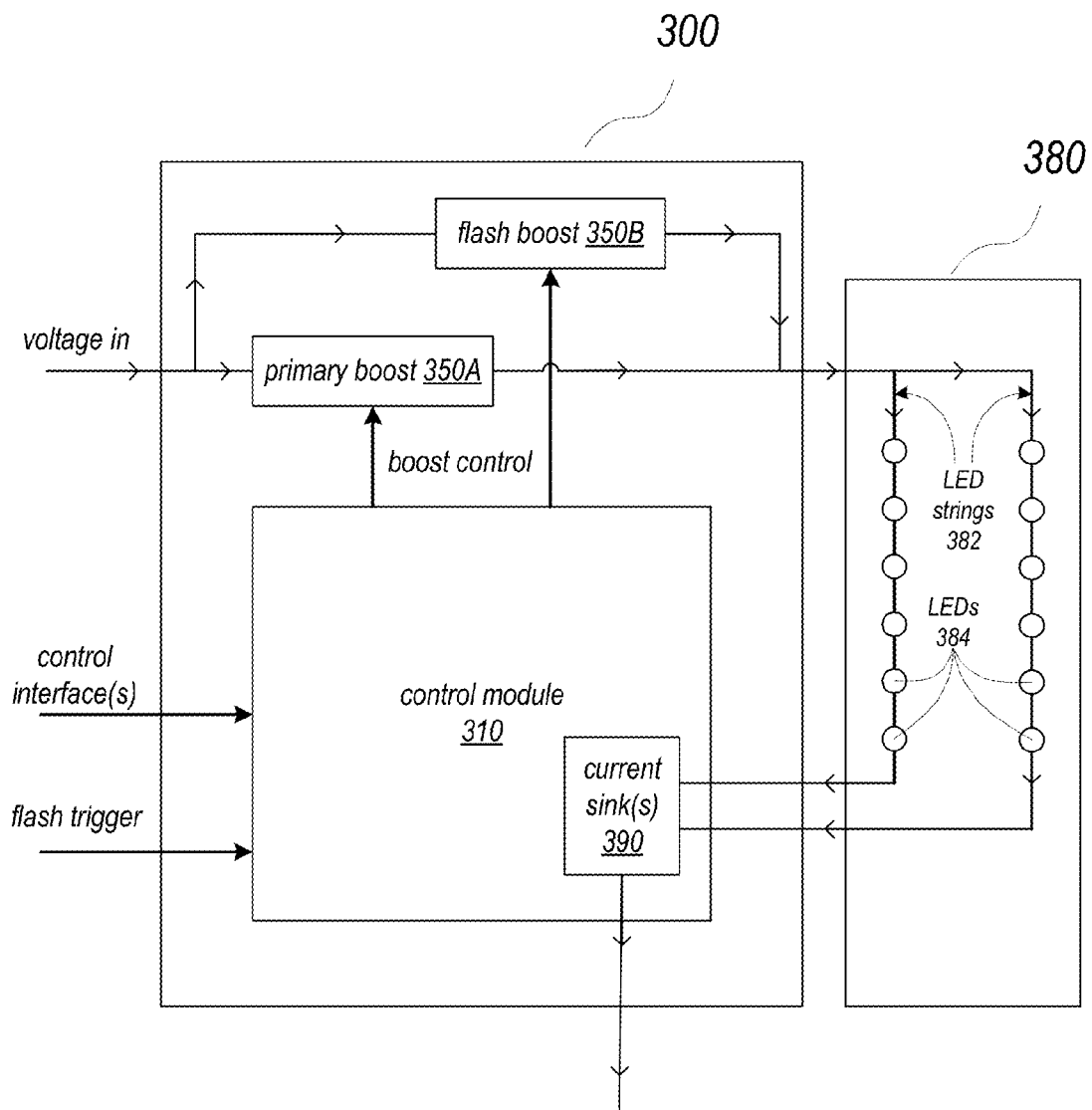
FIG. 3 is a high-level block diagram illustrating an example backlight power management module that implements an asymmetric multiphase boost for a display backlight, according to at least some embodiments.
Figure 4:
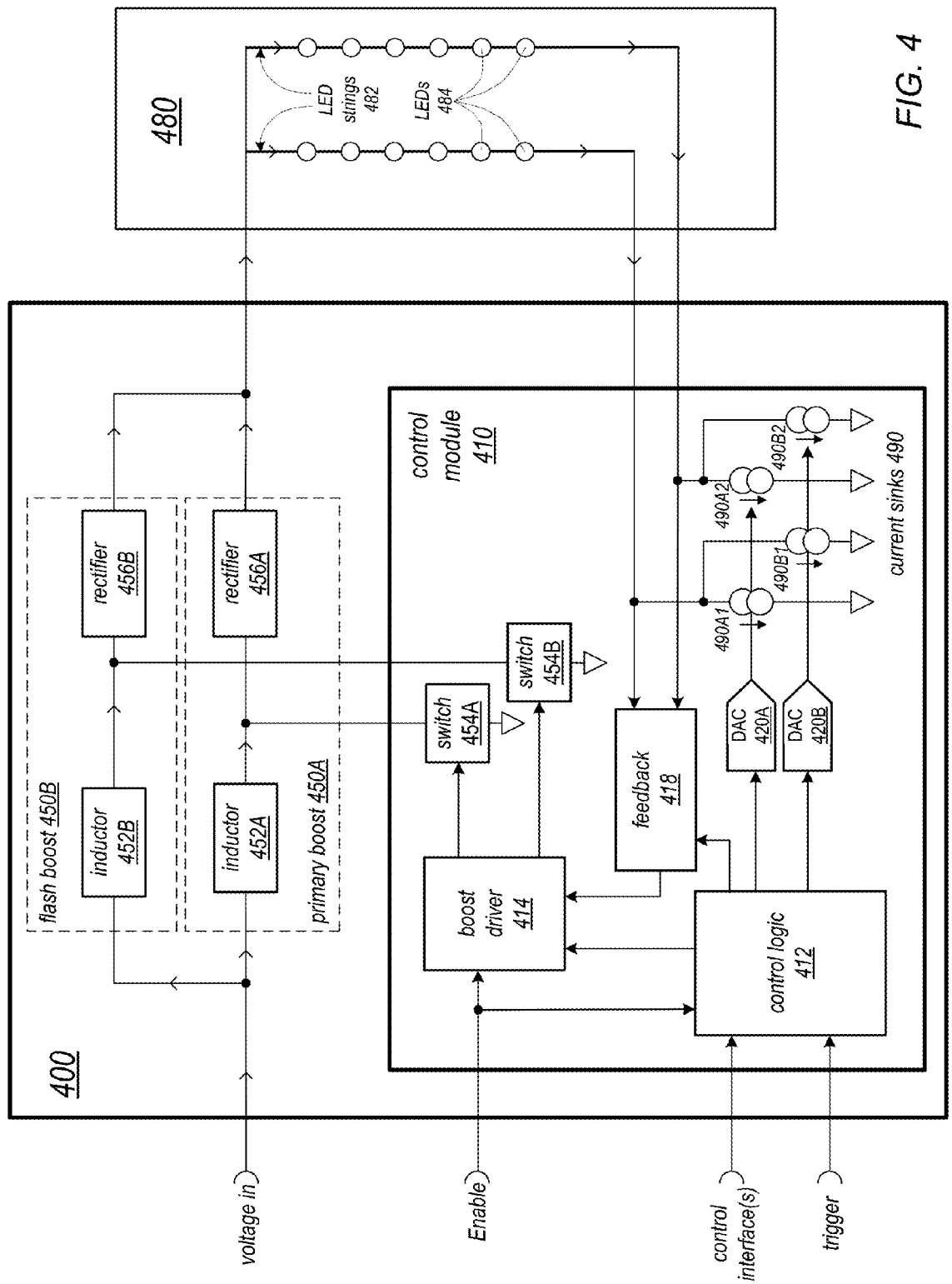
FIG. 4 is a more detailed block diagram of an example backlight power management module that implements an asymmetric multiphase boost for a display backlight, according to at least some embodiments.

Device 10 may include at least one backlight power management module 100 that implements an asymmetric, multiphase boost for backlight 162. A primary boost phase may be sized to provide high low-load efficiency, using high inductance and low switching frequency for normal display backlight operations. A flash boost phase may be sized for high peak power (current), using low inductance and high switching frequency for pulsed current applications. FIGS. 3 and 4 illustrate example backlight power management modules 100 according to at least some embodiments.

Referring to FIG. 2, when capturing a still image using front-facing camera 120, the backlight power management module 100 may be signaled, for example by an image capture module 130 or directly by camera 120, to enable the flash function to illuminate a subject 12 or scene in front of the camera 120. In response, the backlight power management module 100 may enable the flash boost phase to provide a pulsed current to each of one or more LEDs in one or more strings of LEDs in the display backlight 162. The additional pulsed current provided by the flash boost phase drives the boosted voltage to an increased level to accommodate the increased forward voltage of the LED string(s) at the higher current, causing the backlight 162 component to emit a flash pulse of light 190 to illuminate the subject 12 or scene for image capture. For example, in some embodiments, the flash boost phase may provide a pulsed flash at about 4×LED current (power) when compared to the brightest setting used for display backlighting, and about 20×LED current when compared to the typical display brightness setting. As a non-limiting example, in some embodiments, the flash boost phase may quadruple power output capability to the LEDs in the backlight, for example from a maximum of about 25 mA (milliamps) per LED that can be provided by the primary boost phase (with about 5 mA being the typical display brightness setting) to a pulsed current of about 100 mA per LED provided by the flash boost phase. When the flash pulse is over, the flash boost phase is returned to an idle state, allowing the high efficiency, primary boost phase to operate for normal backlighting operations of the display 160.

In some embodiments, to capture still images of subjects 12 or scenes using camera 120, the device 10 may include one or more image capture modules 130. In some embodiments, the image capture module(s) 130 may provide a user interface (UI) via display 160 via which the user may, for example, view the subject 12 or scene in front of camera 120, capture still images of the subject 12 or scene using the camera 120, and view the captured images. In some embodiments, in response to a user indicating that a still image of a subject 12 or scene is to be captured (e.g., by selecting a "shutter release" UI element) the image capture module(s) 130, the image capture module(s) 130 may signal the backlight power management module(s) 100 to trigger a flash, and signal the camera 120 to capture an image. The flash and capture signals may be timed so that the flash of illumination 190 provided by the backlight 162 is coordinated with the shutter release of the camera 120. In some embodiments, the flash may be triggered fractionally before the shutter release so that the subject 12 or scene is illuminated by the flash when the shutter is opened. In some embodiments, duration of the flash pulse may be synchronized with the exposure time of the camera 120 so that the amount of light reflected off of the subject 12 or scene and refracted by the camera 120 optics onto the camera 120 sensor during exposure is relatively uniform. In some embodiments, instead of the image capture module(s) 130 signaling the backlight power management module(s) 100 to perform a flash, the backlight power management module(s) 100 may be signaled to perform a flash directly by the camera 120.

In some embodiments, the device 10 may also include one or more ambient light sensors 140. In some embodiments, image capture module(s) 130 may obtain ambient light information from ambient light sensor(s) 140. The ambient light information may, for example, be used by image capture module(s) 130 to adjust one or more parameters of camera 120 when capturing an image, for example aperture setting and/or exposure time. In some embodiments, the ambient light information may be used to by image capture module(s) 130 to enable or disable the flash function according to an ambient light level threshold. For example, if the ambient light sensor 140 detects that there is not enough ambient light illuminating the subject 12 to capture a quality image according to the ambient light level threshold, then image capture module 130 may trigger a flash by signaling backlight power management module(s) 100. If the ambient light sensor 140 detects that there is enough ambient light illuminating the subject 12 to capture a quality image, then image capture module 130 may not trigger a flash by signaling backlight power management module(s) 100. In some embodiments, the ambient light level threshold may be adjustable via the user interface. In some embodiments, the ambient light level threshold may be varied based on current camera settings.

In some embodiments, when capturing a still image of a subject 12 or scene using the backlight 162 to provide a flash for the camera 120, the image capture module(s) 130 may control the LCD 164 component of display 160 in coordination with the flash provided via backlight 162. For example, in some embodiments, the image capture module(s) 130 may signal the LCD 164 to turn all pixels white during the flash. In some embodiments, the image capture module(s) 130 may analyze ambient light information obtained from ambient light sensor(s) 140 to determine a color for optimum still image capture at a current camera setting, and signal the LCD 164 to display the color during the flash so that the illumination 190 provided by the flash function is of the determined color. In some embodiments, instead of or in addition to analyzing ambient light information to determine a color for flash, the image capture module(s) 130 may analyze image data of a current scene in front of camera 120 obtained from the camera 120 sensor to determine a color for optimum still image capture, and signal the LCD 164 to display the color during the flash. In some embodiments, instead of or in addition to automatic control of LCD 164 color during a flash, a user interface may be provided via which a user may specify a color to be used during a flash. When a still image capture is initiated, the image capture module(s) 130 may signal the LCD 164 to display the user-specified color during the flash.

In some embodiments, device 10 may provide one or more mechanisms via which a user may enable or disable the flash function provided via the backlight power management module 100. For example, an image capture module 130 installed on the device 10 may be used for capturing still images of subjects 12 or scenes with camera 120, and in some embodiments the image capture module 130 may provide a user interface whereby the user can enable or disable the flash function provided via the backlight power management module 100.

FIG. 3 is a high-level block diagram illustrating an example backlight power management module that implements an asymmetric multiphase boost for a display backlight, according to at least some embodiments. Display backlight 380, may, for example, be a light-emitting diode (LED) display backlight used to provide illumination for a liquid-crystal display (LCD) display. A backlight power management module 300 may control power to one or more LED strings 382 in backlight 380, each string 382 including one or more LEDs 384. The backlight power management module 300 may implement and control an asymmetric multiphase boost that includes two boost phases: a primary boost 350A phase for typical display backlighting via display backlight 380, and a secondary or flash boost 350B phase that provides flash functionality via the display backlight 380 when needed. The primary boost 350A may be sized to provide high low-load efficiency, using high inductance and low switching frequency for normal display backlight 380 operations. The flash boost 350B may be sized for high current and peak power, using low inductance and high switching frequency for pulsed current applications. One or more backlight power management modules 300 as illustrated in FIG. 3 may, for example, be implemented in a device 10 as shown in FIG. 2 to provide normal display backlighting for an LCD 164 via primary boost 350A phase as well as a camera flash function for a front-facing camera 120 via flash boost 350B phase.

In some embodiments, the asymmetric multiphase boost may be implemented as a boost circuit that receives power (voltage in) from a power source such as a battery. The boost circuit includes one or more strings 382 of LEDs 384 to be powered, primary boost 350A and flash boost 350B components located in front of (on the anode side of) LED strings 382, and current sink(s) 390 located behind (on the cathode side of) LED strings 382. The current sink(s) 390 may include sensing and feedback elements to implement local regulation of the current in the current sink(s). A control module 310 of backlight power management module 300 may include components configured to control and manage the asymmetric multiphase boost circuit components, including the primary boost 350A, flash boost 350B, and current sink(s) 390 components. Example control module, primary boost, and flash boost components are shown in more detail in FIG. 4.

Referring to FIG. 3, in some embodiments of a backlight power management module 300, to power the LEDs 384 in the LED strings 382 of backlight 380, current sink(s) 390 on the cathode side of the LED strings 382 act to draw current through the LEDs 384 in the strings 382. In some embodiments, control module 310 may control the current sink(s) 390 to regulate the amount of current that the sinks 390 are drawing. In order for the current sinks 390 to be able to draw the required current through the LEDs 384, an appropriate voltage is maintained at the anodes of the LEDs 384 to provide the needed headroom for the current sink(s). Note that the headroom voltage at the anodes of the LEDs 384 may be determined according to a function of the current through the LEDs 384.

In some embodiments the LED current regulation may be implemented using current source(s) located at the anode side of the LED string(s) 382 in place of the current sink(s) 390 located at the cathode side of the LED string(s) 382. In such a configuration the anode side of the LED string(s) 382 is grounded.

In at least some embodiments, primary boost 350A and flash boost 350B components act to provide the appropriate voltage at the anodes of the LEDs 384 under control of the control module 310. Primary boost 350A and flash boost 350B may each be considered as a phase of the multiphase boost. The two phases of the multiphase boost provided by backlight power management module 300 may be sized differently, thus making the phases asymmetric. For example, primary boost 350A phase may be sized to provide high low-load efficiency, using high inductance and low switching frequency for normal display backlight 380 operations. Flash boost 350B phase may be sized for high peak power (current), using low inductance and high switching frequency for pulsed current applications, such as camera flash applications.

Figure 5:
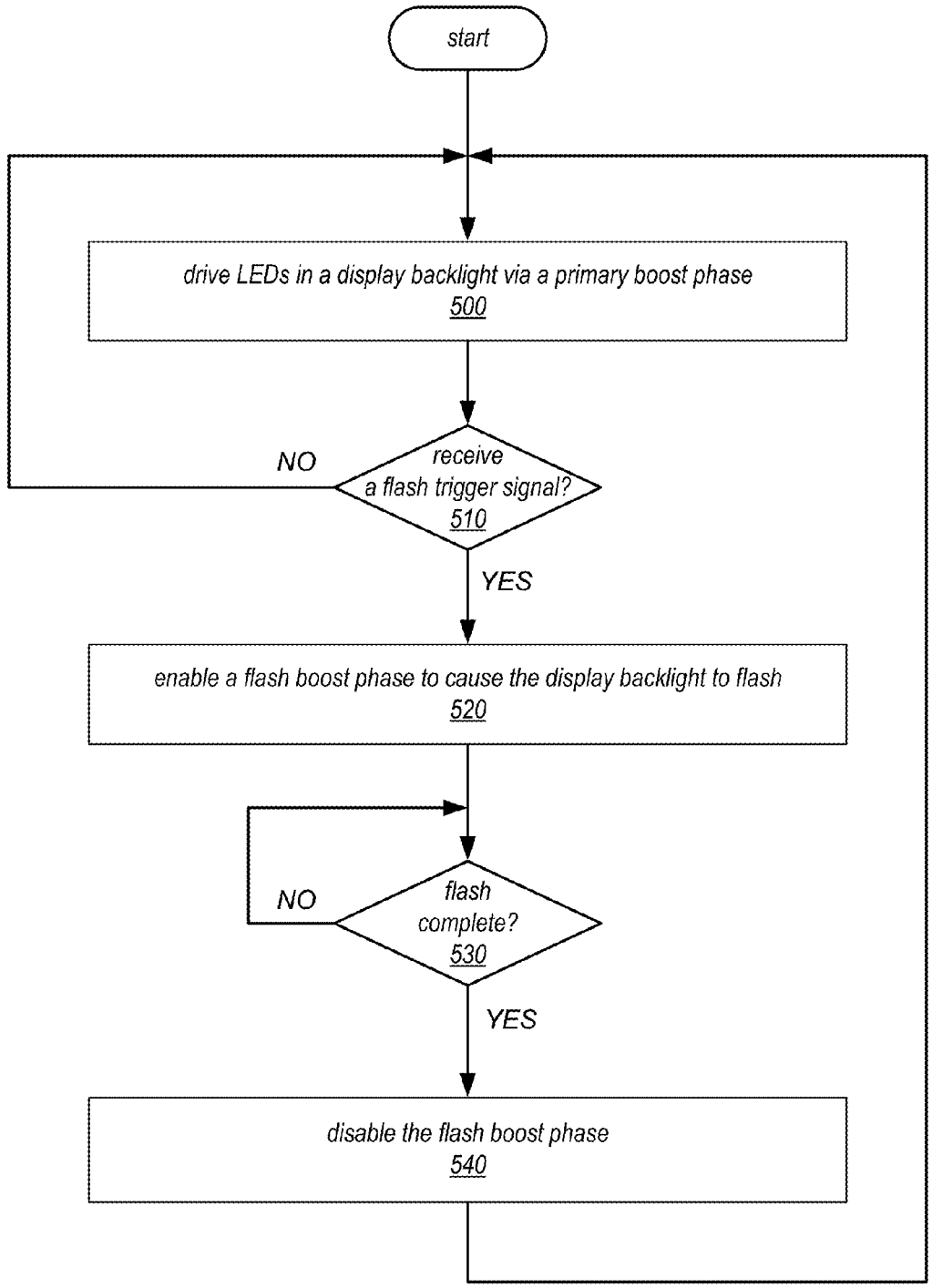
FIG. 5 is a high-level flowchart of a method for providing an asymmetric multiphase boost for a display backlight to provide camera flash functionality for a front-facing camera of a device, according to at least some embodiments.

FIG. 5 is a high-level flowchart of a method for providing an asymmetric multiphase boost for a display backlight to provide camera flash functionality for a front-facing camera of a device, according to at least some embodiments. Reference is made to elements of FIG. 3.

As indicated at 500 of FIG. 5, the backlight power management module 300 may drive LEDs 384 in a display backlight 380 via a primary boost 350A phase. In some embodiments, during normal display backlight 380 operations, the backlight power management module 300 may control primary boost 350A and/or current sink(s) 390 to provide appropriate power to the LEDs 384 in LED strings 382 of display backlight 380. As a non-limiting example, in some embodiments, the LEDs 384 in the backlight may draw about 5 mA (per LED 384) at a typical display brightness setting, with a maximum of about 25 mA per LED 384. As a non-limiting example, in some embodiments, the primary boost 350A may be configured to boost a voltage input of 3 volts from the power supply (e.g., battery) to 18 volts for input to the anodes of the LEDs 384, assuming two strings of six LEDS and a 5 mA per LED 384 load. In some embodiments, one or more control interfaces may be received by control module 310 to adjust the display brightness by appropriately adjusting the primary boost 350 and/or current sink(s) 390 components for the primary boost 350 phase. Note, however, that the adjustment is constrained by the parameters of the components of the primary boost 350.

As indicated at 510 of FIG. 5, the backlight power management module 300 may receive a flash trigger signal. In some embodiments, to provide the flash function, the control module 310 of the backlight power management module 300 may receive a flash trigger signal, for example from an image capture module or directly from a camera. As indicated at 520 of FIG. 5, in response to the flash trigger, the control module 310 may enable the flash boost 350B phase to cause the display backlight 380 to flash. In some embodiments, to enable the flash boost 350B phase, backlight power management module 300 may signal the current sink(s) 390 to draw the required current through the LED string(s) 382 while enabling the flash boost 350B to provide the appropriate voltage to the anodes of the LEDs 384 for the flash boost phase. The pulsed current provided by the flash boost 350 phase requires an increase to the boost voltage to accommodate the increased voltage across the LED string(s) 382 at the higher current while maintaining the necessary headroom voltage across the current sink(s) 390, allowing the LEDs 384 to emit a flash pulse of light, for example to illuminate a subject or scene for image capture by a front-facing camera.

As a non-limiting example, in some embodiments, enabling the flash boost 350B phase may quadruple power output to the LEDs 384 in the backlight 380, for example from a maximum of about 25 mA per LED 384 that can be provided by the primary boost 350A phase (with about 5 mA being the typical display brightness setting) to a pulsed current of about 100 mA per LED 384 provided by the flash boost 350B phase.

At 530 of FIG. 5, when the flash has completed, the backlight power management module 300 disables the flash boost phase as indicated at 540. When the flash pulse has completed, the flash boost 350 phase is returned to an idle state, allowing the high efficiency, primary boost 350A phase to operate for normal backlighting operations.

In embodiments of the backlight power management module 300, when powering the backlight 380 for normal backlighting operations, the primary boost 350A phase is enabled. When a flash trigger is received, the flash boost 350 phase is enabled for a brief time interval (e.g., an interval to correspond with an exposure time of the camera) to increase power to the LED strings 382 and thus cause the backlight 380 to generate a flash. In some embodiments, the primary boost 350A and flash boost 350B phases may work in conjunction. In these embodiments, the primary boost 350 remains enabled during the flash, and enabling the flash boost 350B phase increases current draw at sink(s) 390 and the headroom voltage at the anodes of the LEDs 384 appropriately to generate the flash. For example, assuming a 25 mA maximum current for the primary boost 350 components, to achieve 100 mA through the boost circuit, the flash boost 350B components may be sized to support 75 mA. As an alternative, in some embodiments, the primary boost 350A and flash boost 350B phases may work separately or independently. In these embodiments, the flash boost 350B is enabled during the flash, and the primary boost 350 is disabled or bypassed during the flash. The flash boost 350B is then disabled, and the primary boost 350A is enabled to resume normal backlighting. Thus, in these embodiments, to achieve 100 mA through the boost circuit, the flash boost 350B components may be sized to support the full 100 mA load.

FIG. 4 is a more detailed block diagram of an example backlight power management module that implements an asymmetric multiphase boost for a display backlight, according to at least some embodiments. A backlight power management module 400 may control power to a display backlight 480. The backlight power management module 400 may implement an asymmetric multiphase boost that includes two boost phases: a primary boost 450A phase for typical display backlighting via display backlight 480, and a flash boost 450B phase that provides flash functionality via the display backlight 480 when needed. One or more components of the flash boost 450B phase may be sized differently than the corresponding components of the primary boost 450A phase, thus making the boost phases asymmetric. The primary boost 450A phase may be sized to provide high low-load efficiency, using high inductance and low switching frequency for normal display backlight 480 operations. The flash boost 450B phase may be sized for high current and peak power, using low inductance and high switching frequency for pulsed current (e.g., camera flash) applications.

In some embodiments, the asymmetric multiphase boost may be implemented as a boost circuit that receives power (voltage in) from a power source such as a battery. The boost circuit may include one or more strings 482 of LEDs 484 in the backlight 480 to be powered, primary boost 450A and flash boost 450B components located in front of (on the anode side of) LED strings 482, and one or more current sinks 490 located behind (on the cathode side of) LED strings 482. A control module 410 of backlight power management module 400 may include one or more components that act to control the asymmetric multiphase boost circuit to thus control power to the display backlight 480, for example control logic 412, boost driver 414, and feedback 418.

In some embodiments, the primary boost 450A components located on the anode side of LED strings 482 may include an inductor 452A, a switch 454A component, and a voltage rectifier 456A component. In some embodiments, the flash boost 450B components located on the anode side of LED strings 482 may include an inductor 452B, a switch 454B component, and a voltage rectifier 456B component.

Efficiency of boost circuits typically varies as a function of load. For typical backlighting operations in mobile devices, generally a goal is to optimize efficiency at relatively low-load current to conserve battery life. In some embodiments, to provide high efficiency voltage boosting during normal display backlighting operations, an inductor 452A with relatively high inductance is used for primary boost 450A phase. For high low-load efficiency, a relatively high inductance may be chosen to minimize AC losses in the inductor 452A, since AC losses dominate when compared to DC losses under low-load. In addition, a relatively low switching frequency may be used in primary boost 450A phase to minimize the switching losses. In some embodiments, the switching frequency may be adjusted depending on load current (e.g., as determined by a brightness level setting input to module 400); the inductor 452A may be sized to have optimal efficiency in a typical scenario (typical or medium brightness, e.g. about 5 mA per LED 384), while still being able to support higher load current (maximum brightness, e.g. about 25 mA per LED 384), without the inductor ripple current reaching saturation current limits.

Implementing flash functionality for the display backlight 480 requires peak power capability in a given volume, which may conflict with the high efficiency at low-load requirements for typical backlighting operations. To provide both high efficiency during typical display backlighting as well as a flash function within the power and volume constraints of mobile device applications, the backlight power management module 400 implements an asymmetric multiphase boost that includes a flash boost 450B phase in addition to primary boost 450A phase. To provide flash functionality, components of the flash boost 450B phase may be sized for high peak power. In some embodiments, to support high peak power, an inductor 452B with relatively low inductance may be used for flash boost 450B phase. In addition, a relatively high switching frequency may be used by the flash boost 450B phase.

As a non-limiting example, in some embodiments, the primary boost 450A phase may be configured for display backlighting at 500 kHz-1 MHz switching frequency depending on brightness level setting, with a 15 μH inductor (H=Henry, unit of inductance). To provide flash functionality, the flash boost 450B phase may operate at 2 MHz switching frequency with a 1 μH inductor. In some embodiments, during typical operations, the backlight 480 may be set to some DC current level based on a brightness setting of the device. To trigger a flash, the flash boost 450B phase is enabled to support the pulsed current that drives the forward voltage of the LED string(s) 482 and increases the boost voltage. When the flash pulse is over, the flash boost 450B phase is returned to an idle state, allowing the high efficiency, primary boost 450A phase to operate at the original (reduced) voltage for normal backlighting operations.

In some embodiments, the boost circuit may include switches 454A and 454B, which may be located at the circuit node between inductors 452 and rectifiers 456. Switch 454A may act to enable or disable primary boost 450A phase under control of boost driver 414, and switch 454B may act to enable or disable flash boost 450B phase under control of boost driver 414. In operation, when a switch 454 is operated, it creates a circuit that allows current to pass through a respective inductor 452 that acts to boost voltage on the boost circuit (e.g., from @3V on the input side of the inductor 452 to @18V on the output side of the inductor 452). In some embodiments, switches 454A and 454B may be implemented as field-effect transistors (FETs), or more specifically as metal-oxide-semiconductor field-effect transistors (MOSFETs), e.g. N-channel MOSFETs.

In some embodiments, output of inductors 452 and switches 454 may be AC, e.g. a triangle wave of current. In some embodiments, voltage rectifiers 456 may be located on the boost circuit between inductors 452 and backlight 480 to rectify the boosted voltage provided by inductors 452 to insure that that only positive current goes towards the output (LED strings 482). Each rectifier 456 rectifies the switched inductor output voltage to produce DC boosted output voltage. In some embodiments, voltage rectifiers 456A and 456B may be implemented using semiconductor diodes, for example Schottky diodes. Alternatively, the voltage rectifiers 456 may be implemented using field effect transistors (FETs) to provide synchronous rectification.

In some embodiments, the primary boost 450A components located on the cathode side of LED strings 482 may include a current sink 490A component for each LED string 482 in the boost circuit. In some embodiments, the flash boost 450B components located on the cathode side of LED strings 482 may include a current sink 490B component for each LED string 482 in the boost circuit. Current sink(s) 490 on the cathode side of the LED strings 482 may act to draw current through the LEDs 484 in the strings 482. In some embodiments, control module 410 may control the current sink(s) 490 to regulate the amount of current that the sinks 490 are drawing. In some embodiments, control module 410 may include control logic 412 and one or more control components 420 to establish the set-point for the current sinks 490 for the boost circuit, for example to set or change the current level to be drawn through LEDs 484 via the sinks 490. The controller component(s) 420 may, for example, be implemented as programmable digital-to-analog converters (DACs) 420 as shown in FIG. 4. In some embodiments, there may be a first DAC 420A for the primary boost 450A phase that controls current sink(s) 490A, and a second DAC 420B for the flash boost 450B phase that controls current sink(s) 490B, as shown in FIG. 4. However, more or fewer DACs 420 may be used to control the current sinks 490 in various embodiments.

In some embodiments, during operation, control logic 412 may receive input indicating a backlight function (e.g., normal display backlighting at a brightness setting, or a flash pulse for some duration). In response, current sinks 490 may be directed by control logic 412 via DAC(s) 420 to draw a required level of current through the LEDs 484 to support the backlight function. For example, 100 mA of current may be required for a flash function, and 5-25 mA may be required for normal display backlighting functions. In some embodiments, the current sink(s) 490 may include sensing elements and local feedback that regulate the current to the target as defined by the DAC(s) 420. The current sink current will match the target as long as the voltage across the current sink exceeds the minimum headroom voltage corresponding to the target setting.

In some embodiments, the voltage across the current sink(s) 490 may be signaled through feedback 418 component of the control module 410. In some embodiments, in order for the current sinks 490 to be able to draw the required current through the LEDs 484, an appropriate headroom voltage must be provided at the anodes of the LEDs 484 via the boost 450. In some embodiments, control logic 412 may direct boost driver 414 to drive a required voltage through the boost circuit via control of switch(es) 424 to support the backlight function. In some embodiments, the voltage at the anode side of the LED strings 482 may be regulated to provide the necessary headroom voltage required by current sink(s) 490 at the desired LED string current setting defined by DAC(s) 420. The feedback 418 component compares the lowest LED string anode voltage against the target headroom voltage for the desired LED string current to provide an error signal for the boost driver 414. As the voltage is boosted higher, more voltage is supplied to the anodes of the LEDs 484, which allows sufficient headroom across current sinks 490 to thus satisfy the required current as indicated by the DAC(s) 420. Similarly, boost driver 414 may be signaled to lower the boosted voltage level to regulate the current sink headroom voltage as appropriate for the target current set by DAC(s) 420 if required.

Thus, to support backlight operation (e.g., normal backlighting or flash) at a level of brightness, the boost circuit may be controlled according to a feedback loop in which the headroom voltage of the current sinks 490 is regulated to a level sufficient for the current sink(s) to draw the desired current through the boost circuit, and in which voltage through the boost circuit may be increased or decreased in response to the actual amount of current being drawn through the boost circuit by the current sinks 490.

In at least some embodiments, the primary boost 450A and flash boost 450B components act to provide the appropriate voltage at the anodes of the LEDs 484 under control of the control module 410 to support the current backlight function. In some embodiments, during normal display backlight 480 operations, the control module 410 may control the primary boost 450A phase components to provide an appropriate level of power to the LEDs 484 in LED strings 482 of display backlight 480. As a non-limiting example, in some embodiments, the LEDs 484 in the backlight may draw 5 mA (per LED 484) at a typical display brightness setting, with a maximum of 25 mA per LED 484. In some embodiments, input may be received by control logic 412 of the control module 410 via one or more control interfaces to adjust the display brightness by appropriately adjusting the primary boost 450A components and current DAC 420 settings.

In some embodiments, to provide the flash function, control logic 412 of the control module 410 may receive a flash trigger signal, for example from an image capture module or directly from a camera. In response, the control logic 412 may signal the current sinks 490 to draw the required current through the LED string(s) 482 by changing the target current defined by DAC(s) 420, and enable the flash boost 450B components to provide the appropriate voltage to the anodes of the LEDs 484 for the flash boost 450B phase. The pulsed current provided by the flash boost 450B phase requires an increase to the boost voltage to accommodate the increased voltage across the LED string(s) 482 while maintaining the necessary headroom voltage across the current sink(s) 490, causing the LEDs 484 to emit a flash pulse of light, for example to illuminate a subject or scene for image capture by a front-facing camera. As a non-limiting example, in some embodiments, enabling the flash boost 450B phase may quadruple power output to the LEDs 484 in the backlight 480, for example from a maximum of about 25 mA per LED 484 that can be provided by the primary boost 450A phase (with about 5 mA being the typical display brightness setting) to a pulsed current of about 100 mA per LED 484 provided by the flash boost 450B phase.

When the flash pulse has completed, the flash boost 450B phase is returned to an idle state, allowing the high efficiency, primary boost 450A phase to operate for normal backlighting operations.

In some embodiments of the backlight power management module 400, the primary boost 450A phase may be enabled by the control module 410 when powering the backlight 480 for normal backlighting operations. When a flash trigger is received, the flash boost 450B phase is enabled by the control module 410 to increase power to the LED strings 482 and thus cause the backlight 480 to generate a flash. When the flash event is over, the control module 410 disables the flash boost 450B phase.

In some embodiments, the primary boost 450A and flash boost 450B phases may work in conjunction. In these embodiments, the primary boost 450A phase remains enabled during the flash, and enabling the flash boost 450B phase to help increase the boost voltage in order to maintain sufficient headroom voltage at the anodes of the LEDs 484 to allow the current sink(s) 490 to regulate the current to the increased target defined by DAC(s) 420 and appropriately generate the flash. For example, assuming a 25 mA maximum current for the primary boost 450A phase components, to achieve 100 mA through the boost circuit for the flash function, the flash boost 450B phase components may be sized to support 75 mA. The combination of the 25 mA provided via the primary boost 450A phase and the 75 mA provided via the flash boost 450B phase provides the required total of 100 mA through the boost circuit to support the flash function.

As an alternative, in some embodiments, the primary boost 450A and flash boost 450B phases may work separately or independently. In these embodiments, when the control logic 412 receives a flash trigger, the primary boost 450A phase is disabled, and the flash boost 450B phase is enabled to provide the flash function. After the flash, the flash boost 450B phase is disabled, and the primary boost 450A phase is enabled to resume normal backlighting. In these embodiments, to achieve a required current (e.g., 100 mA) through the boost circuit for the flash function, the flash boost 450B components may be sized to support the full current load for flash (e.g., 100 mA), while the primary boost 450A components may be sized to support only the maximum required for normal backlighting (e.g., 25 mA). Note that, since increasing current through the boost circuit requires an increase in voltage, in these embodiments where the primary boost 450A and flash boost 450B phases work independently, one or more of the components of the primary boost 450A phase may be sized to support a lower maximum voltage than corresponding components of the flash boost 450B phase, as the primary boost 450A phase components are not required to support the higher voltage needed for the flash function. As a non-limiting example, in some embodiments, the FET used as switch 454A in primary boost 450A phase and that only operates at lower currents for typical display backlighting functionality may be a 20V FET, while the FET used as switch 454B in flash boost 450B phase and that needs to support higher voltages for the flash function may be a 25V FET, or a 40V FET.

In some embodiments, the backlight power management module 400 may include one or more mechanisms via which the flash function may be internally enabled or disabled. For example, an enable input to boost driver 414 and/or control logic 412 may be used to enable or disable the flash function. For example, a battery power management module or function on the device may disable the flash function or otherwise limit backlight 480 functionality, for example upon detecting that battery power is below a threshold. In some embodiments, backlight power management module 400 may include one or more fault detection components that may, for example, detect faults in the boost circuit and disable the flash function and/or limit other backlight functionality if necessary. For example, the fault detection components may detect over voltage in the boost circuit to provide over voltage (e.g., open circuit) protection. As another example, the fault detection components may detect over current in the boost circuit to provide over current (e.g., short) protection. As another example, the fault detection components may monitor circuit temperature to limit or shut off backlight functionality if a thermal limit is exceeded in the boost circuit.

In some embodiments, the fault detection components of backlight power management module 400 may provide input under-voltage protection to throttle the amount of power the backlight subsystem is consuming if necessary. In a battery-powered device, the backlight subsystem shares power with other subsystems of the device. The input under-voltage protection acts to prevent the backlight subsystem from pulling the battery to a low voltage level that may compromise other subsystems of the device.

In some embodiments, the backlight power management module 400 may include one or more components that monitor the current at switch(es) 454. If the current exceeds a current limit for switch(es) 454, the boost driver 414 may be signaled that there is a problem so that the boost driver 414 can throttle down the current to the affected switch(es) 454.

Example Computing Device

Figure 6:
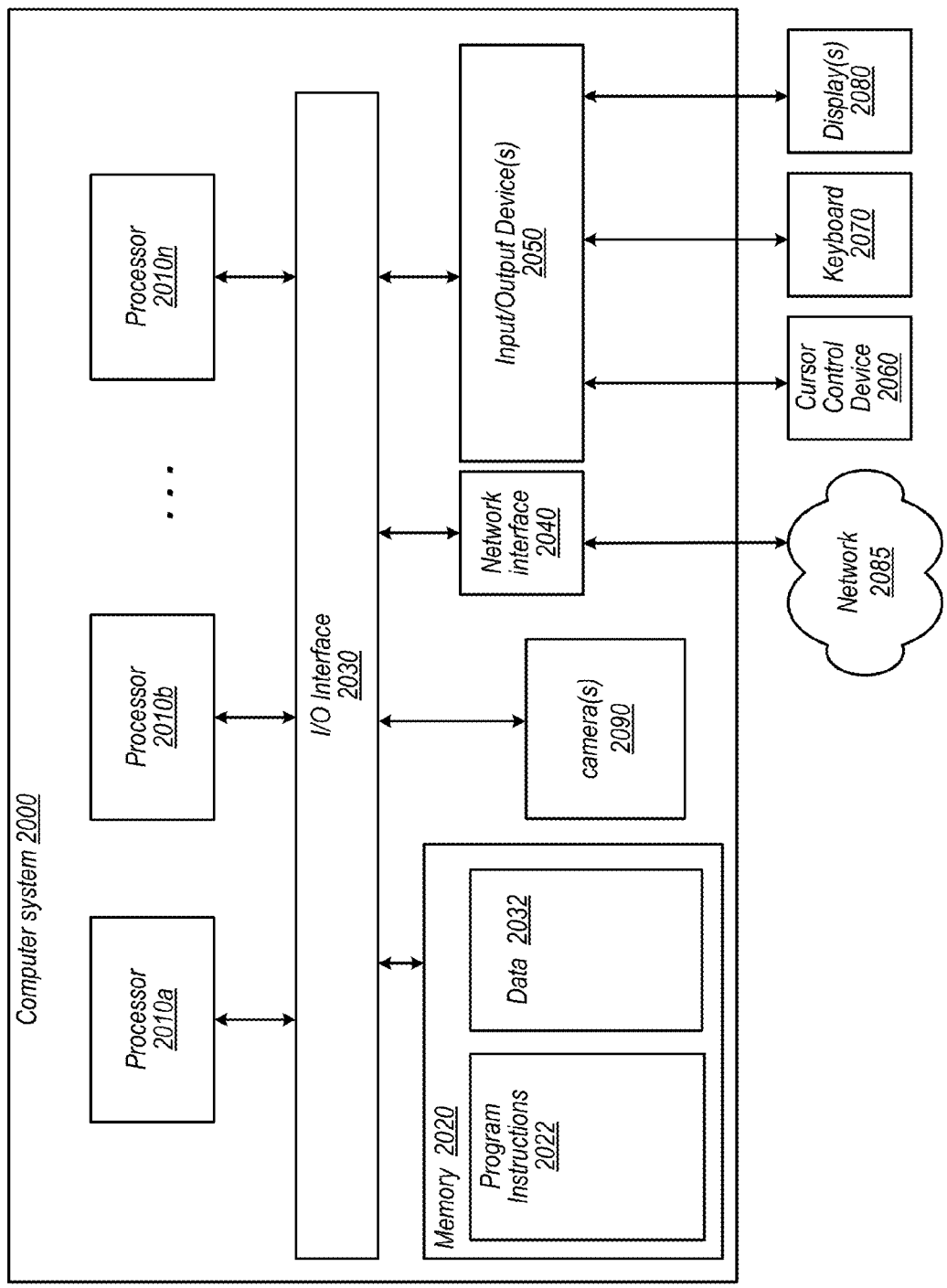
FIG. 6 illustrates an example computer system.

FIG. 6 illustrates an example computing device, referred to as computer system 2000, that may include or host embodiments of a backlight power management module as illustrated in FIGS. 2 through 5. In addition, computer system 2000 may implement methods for controlling operations of a front-facing camera and/or for performing image processing of images captured with a front-facing camera as shown in FIG. 2. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, application server, storage device, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 may also include a network interface 2040 coupled to I/O interface 2030, and one or more input/output devices 2050, such as cursor control device 2060, keyboard 2070, and display(s) 2080 (e.g., a touch-enabled display). Display(s) 2080 may include at least one backlit display 160 as shown in FIGS. 1A, 1B, and 2, for example a liquid-crystal display (LCD) backlit with a light-emitting diode (LED) backlight panel or matrix. Computer system 2000 may also include one or more cameras 2090, for example a front-facing camera 120 as shown in FIGS. 1A, 1B, and 2, which may also be coupled to I/O interface 2030. While not shown, computer system 2000 may also include one or more image capture modules 130, one or more backlight power management modules 100, and an internal power supply 150 (e.g., a battery) as illustrated in FIG. 2. In some embodiments, computer system 2000 may also include one or more ambient light sensors 140 as illustrated in FIG. 2.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various applications, interfaces, methods and/or data for controlling operations of camera(s) 2090 and for capturing and processing images with camera(s) 2090 or other methods or data, for example interfaces and methods for capturing, displaying, processing, and storing images captured with camera(s) 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 6, memory 2020 may include program instructions 2022, which may be processor-executable to implement any element or action to support integrated camera(s) 2090, including but not limited to image processing software and interface software for controlling camera 2090. In at least some embodiments, images captured by camera(s) 2090 may be stored to memory 2020. In addition, metadata for images captured by camera(s) 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   a display comprising a backlight component; and
   a backlight power management module comprising a multiphase boost configured to provide boosted power to the backlight component via a boost circuit, wherein the boost circuit includes a primary boost phase and a flash boost phase, wherein the primary boost phase is configured to utilize high inductance and low switching frequency when compared to the flash boost phase for normal display backlighting applications, and wherein the flash boost phase is configured to utilize low inductance and high switching frequency when compared to the primary boost phase for pulsed power applications;
   wherein the backlight power management module is configured to:
      power the backlight component via the primary boost phase to provide normal backlighting for the display; and
      enable the flash boost phase in response to a flash trigger to provide pulsed power to the backlight component to cause the display to flash.

2. The apparatus as recited in claim 1, wherein the backlight power management module is further configured to:
   disable the primary boost phase prior to enabling the flash boost phase;
   disable the flash boost phase after the flash; and
   enable the primary boost phase after disabling the flash boost phase.

3. The apparatus as recited in claim 1, wherein each boost phase of the boost circuit includes:
   an inductor component configured to boost input voltage from a power source to provide boosted voltage output to the backlight component; and
   a switch component, wherein the backlight power management module is configured to control the voltage on the respective boost phase via the switch component.

4. The apparatus as recited in claim 3, wherein each boost phase of the boost circuit includes a rectifier component configured to rectify the switched inductor output voltage to produce DC boosted output voltage.

5. The apparatus as recited in claim 3, wherein the switch component comprises a field effect transistor (FET).

6. The apparatus as recited in claim 3, wherein each boost phase of the boost circuit further includes:
   one or more current sinks configured to draw current through the backlight component; and
   one or more controllers configured to control a level of current that the one or more current sinks draw through the backlight component.

7. The apparatus as recited in claim 1, wherein the backlight component is a light-emitting diode (LED) display backlight, wherein the boost circuit includes one or more LED strings of the LED display backlight.

8. A method, comprising:
   providing boosted power to a display backlight via a primary boost phase of a boost circuit to provide normal backlit illumination for a display;
   receiving a flash trigger signal;
   in response to the flash trigger signal, enabling a flash boost phase of the boost circuit to provide pulsed power to the display backlight, wherein the pulsed power causes the display backlight to flash; and
   disabling the flash boost phase to return the display backlight to normal backlit illumination as provided via the primary boost phase of the boost circuit;
   wherein the primary boost phase includes one or more components that are sized to provide high inductance and low switching frequency, and wherein the flash boost phase includes one or more components that are sized to provide low inductance and high switching frequency.

9. The method as recited in claim 8, further comprising:
   disabling the primary boost phase prior to enabling the flash boost phase; and
   enabling the primary boost phase after disabling the flash boost phase to return the display backlight to normal backlit illumination as provided via the primary boost phase of the boost circuit.

10. The method as recited in claim 8, wherein the primary boost phase is not disabled while the flash boost phase is enabled.

11. The method as recited in claim 8, wherein the display backlight is a light-emitting diode (LED) display backlight that provides illumination through a liquid-crystal display (LCD), wherein the method further comprises setting the LCD to a particular color in response to the flash trigger signal so that the flash illuminates a subject or scene in front of the LCD with light of the particular color.

12. A device, comprising:
   a power supply;
   a backlit display comprising a backlight component;
   a camera configured to capture an image of a scene or subject located in front of the display; and
   a backlight power management module configured to:
      boost power from the power supply to the backlight component via a primary boost phase of a boost circuit to provide normal backlit illumination for the display; and
      in response to a flash trigger signal, enable a flash boost phase of the boost circuit to provide pulsed power to the backlight component;
      wherein the pulsed power provided by the flash boost phase generates a flash by the backlight component to illuminate the scene or subject in front of the camera while capturing an image of the scene or subject; and
      wherein the primary boost phase includes one or more components that are sized to provide high inductance and low switching frequency, and wherein the flash boost phase includes one or more components that are sized to provide low inductance and high switching frequency.

13. The device as recited in claim 12, wherein the backlight power management module is configured to disable the flash boost phase to return the backlight component to normal backlit illumination as provided via the primary boost phase of the boost circuit.

14. The device as recited in claim 13, wherein the backlight power management module is configured to:
   disable the primary boost phase in response to the flash trigger signal and prior to enabling the flash boost phase; and
   enable the primary boost phase after disabling the flash boost phase.

15. The device as recited in claim 12, wherein the backlit display is a liquid-crystal display (LCD), and wherein the backlight component is a light-emitting diode (LED) display backlight that provides illumination through the LCD.

16. The device as recited in claim 15, wherein the device further comprises an image capture module configured to control operations of the camera and to generate the flash trigger signal, and wherein the image capture module is further configured to set the LCD to a particular color or to white so that the flash generated by the backlight component illuminates the scene or subject in front of the LCD with light of the particular color or with white light.

17. The device as recited in claim 12, wherein each boost phase of the boost circuit includes:
- an inductor component configured to boost input voltage from a power source to provide boosted voltage output to the backlight component;
- a switch component, wherein the backlight power management module is configured to control the voltage on the respective boost phase via the switch component;
- a rectifier component configured to rectify the switched inductor output voltage to produce DC boosted output voltage;
- one or more current sinks configured to draw current through the backlight component; and
- one or more controllers configured to control a level of current that the one or more current sinks draw through the backlight component.

* * * * *